United States Patent
Estrada et al.

(10) Patent No.: US 10,452,467 B2
(45) Date of Patent: Oct. 22, 2019

(54) AUTOMATIC MODEL-BASED COMPUTING ENVIRONMENT PERFORMANCE MONITORING

(71) Applicant: Intel Corporation, Santa Clara, CA (US)

(72) Inventors: Giovani Estrada, Dublin (IE); Victor Bayon-Molino, Maynooth (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/009,494

(22) Filed: Jan. 28, 2016

(65) Prior Publication Data

US 2017/0220407 A1 Aug. 3, 2017

(51) Int. Cl.
*G06F 11/07* (2006.01)
*G06F 11/34* (2006.01)
*G05B 13/04* (2006.01)
*G06F 11/00* (2006.01)

(52) U.S. Cl.
CPC ........ *G06F 11/0793* (2013.01); *G06F 11/079* (2013.01); *G06F 11/0751* (2013.01); *G06F 11/3495* (2013.01); *G05B 13/04* (2013.01); *G06F 11/008* (2013.01)

(58) Field of Classification Search
CPC ............... G06F 11/008; G06F 11/0793; G06F 11/0751; G06F 11/079; G06F 11/3495; G05B 23/0283; G05B 23/0286; G05B 23/0289

See application file for complete search history.

(56) References Cited

U.S. PATENT DOCUMENTS

| | | | |
|---|---|---|---|
| 8,401,833 B2 | 3/2013 | Radibratovic et al. | |
| 2003/0074166 A1* | 4/2003 | Jackson | G05B 13/048 703/2 |
| 2007/0179746 A1* | 8/2007 | Jiang | G06F 11/008 702/185 |

(Continued)

FOREIGN PATENT DOCUMENTS

| | | | |
|---|---|---|---|
| WO | WO-2004099925 A2 | 11/2004 | |
| WO | WO-2017131864 A1 | 8/2017 | |

OTHER PUBLICATIONS

Wikipedia's Naive Bayes Classifier historical version published Jan. 27, 2016 https://en.wikipedia.org/w/index.php?title=Naive_Bayes_classifier&oldid=701917141.*

(Continued)

*Primary Examiner* — Joseph O Schell
(74) *Attorney, Agent, or Firm* — Schwegman Lundberg & Woessner, P.A.

(57) ABSTRACT

Various systems and methods for implementing automatic model generation for performance monitoring are described herein. A performance monitoring system includes a model manager to: identify a performance model that predicts performance of an operational node, the performance model based on telemetry data from the operational node; and implement an automatic verification operation to analyze the performance model and revise the performance model when the performance model is no longer valid; and an event processor to: initiate a remedial action at the operational node when the performance model indicates an alert state.

25 Claims, 6 Drawing Sheets

(56) References Cited

U.S. PATENT DOCUMENTS

| | | | |
|---|---|---|---|
| 2010/0318837 A1* | 12/2010 | Murphy | G06F 11/1461 |
| | | | 714/4.1 |
| 2012/0023041 A1* | 1/2012 | Kariv | G06F 11/3447 |
| | | | 706/12 |
| 2014/0108640 A1* | 4/2014 | Mathis | H04L 41/145 |
| | | | 709/224 |
| 2014/0122387 A1 | 5/2014 | Chi et al. | |
| 2015/0120636 A1 | 4/2015 | Gao | |
| 2015/0135012 A1 | 5/2015 | Bhalla et al. | |
| 2015/0269120 A1* | 9/2015 | Nakatsugawa | G06F 17/5009 |
| | | | 703/2 |
| 2015/0378807 A1* | 12/2015 | Ball | G06F 11/008 |
| | | | 714/47.3 |
| 2016/0153806 A1* | 6/2016 | Ciasulli | G06F 11/0751 |
| | | | 702/184 |
| 2016/0162779 A1* | 6/2016 | Marcus | G06N 99/005 |
| | | | 706/12 |

OTHER PUBLICATIONS

"International Application Serial No. PCT/US2016/065163, International Search Report dated Mar. 20, 2017", 3 pgs.
"International Application Serial No. PCT/US2016/065163, Written Opinion dated Mar. 20, 2017", 6 pgs.
"International Application Serial No. PCT US2016 065163, International Preliminary Report on Patentability dated Aug. 9, 2018", 8 pgs.

* cited by examiner

AUTOMATIC MODEL-BASED COMPUTING ENVIRONMENT PERFORMANCE MONITORING

TECHNICAL FIELD

Embodiments described herein generally relate to application performance tuning and in particular, to automatic model generation for performance monitoring.

BACKGROUND

Computer and network performance monitors allow a user to gather and analyze system performance metrics. Some monitors provide real time analysis and visualization, alerts, logging, and recovery operations. Performance monitors may be local to a machine or remote from the machine, and may monitor many facets of an application, machine, or network's performance.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
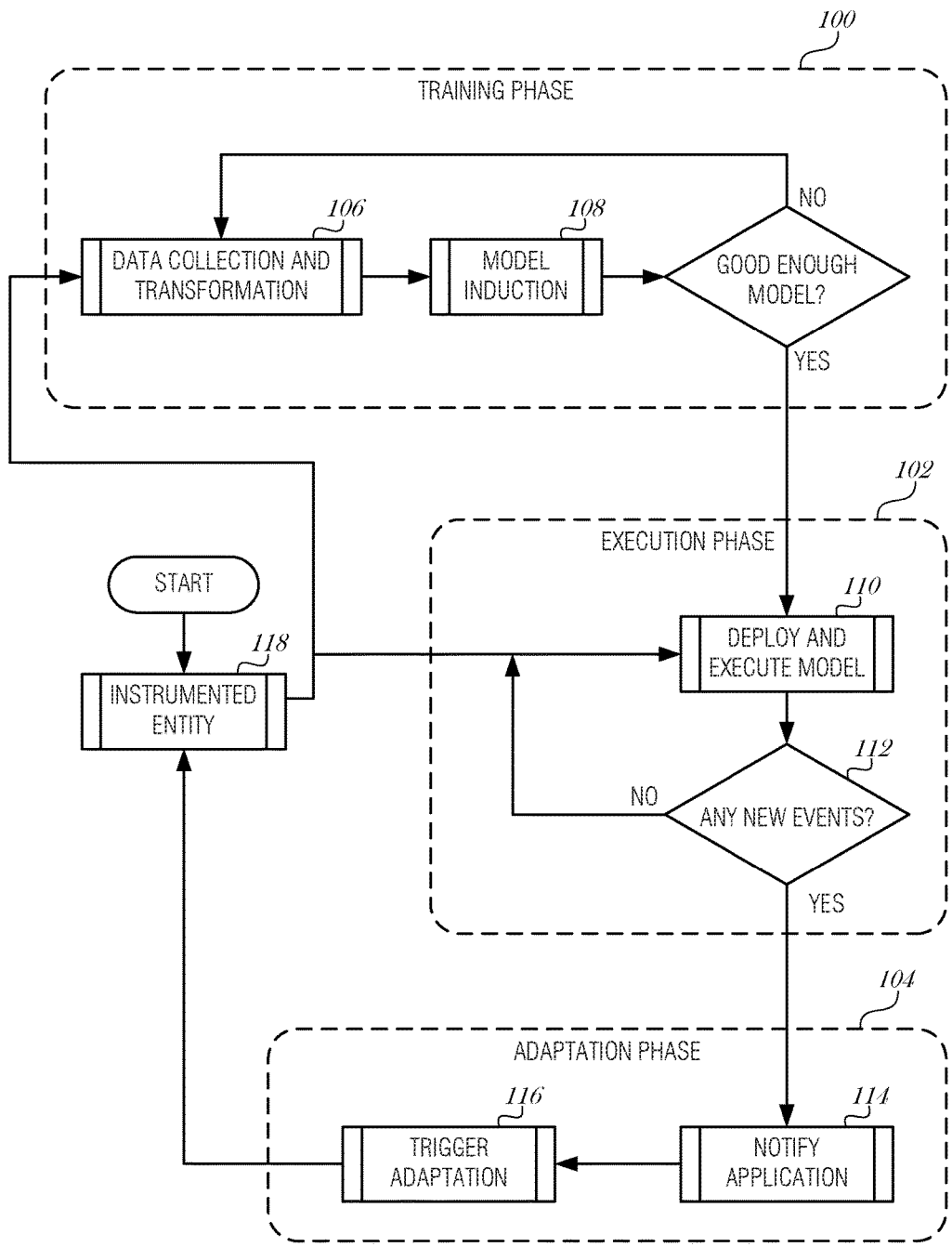
FIG. 1 is a schematic diagram illustrating operational phases, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Systems and methods described herein implement automatic model generation for performance monitoring. Performance monitoring may include various types of monitoring, such as network monitoring, system monitoring, or application monitoring. Network monitoring includes tools and systems to monitor and analyze a computer network to determine slow or failing components. It may monitor number of packets transmitted or received, data throughput, response time, availability, uptime, error reports, and the like.

System monitoring includes tools and systems to monitor and analyze a computer system's resource usage (e.g., disk usage, central processing unit (CPU) utilization, memory usage, etc.), data access, user operations, active users, data received, services and tasks, networking metrics, and the like. An example system performance monitor is Windows Performance Monitor by Microsoft® of Redmond, Wash.

Application monitoring includes tools and systems to monitor and analyze one or more executing applications. An application monitor (e.g., profiler) may provide real time, code-level metrics of application performance. Application monitors provide insight into how an application performs in real world conditions, such as how an application interacts with an operating system or a particular set of hardware. While some information about an application may be obtained with a system monitor, such as how much memory an executing thread is consuming, an application monitor provides more detail than what is typically available from a system monitor.

Conventional performance monitors are configured by an administrator with one or more static threshold values, which when violated, cause the monitor to log an error and optionally notify the administrator. Other remedial processes may be initiated based on the type or severity of the event. For example, network infrastructure health checks may be defined with a threshold on latency or throughput. However, as load patterns in a cloud environment become unpredictable, static thresholds may be inconsistently valid and result in false positives. What is needed is a more flexible mechanism to cope with abnormal behavior in a cloud environment. While the example provided here refers to a cloud environment, it is understood that a dynamic model-based monitoring platform, such as that described here, may operate in any type of computing environment.

The mechanisms described herein provide advanced analytic capabilities to orchestrators and network monitoring tools. Health check models may be automatically generated based on telemetry data and then deployed as complex event processing (CEP) to keep track of performance issues and provide a way to retrain the model when the prediction accuracy deteriorates. When problems arise, alert and adaptation mechanisms may be triggered. As such, the disclosure provides the building blocks for automatic health model generation and adaptation to address and overcome performance problems.

FIG. 1 is a schematic diagram illustrating operational phases, according to an embodiment. The operational phases include a training phase 100, an execution phase 102, and an adaptation phase 104. The system is able to use telemetry data and advanced analytics to automatically learn performance models (training phase 100); models are then deployed back as CEP to either check the instrumented applications or platforms (execution phase 102). Prediction errors against observed performance provide insight as to whether the model needs retraining (model self-validation in the execution phase 102) to guard against loss of accuracy over time. When a predicted application or platform degradation arises, a suitable adaptation mechanism is then selected and initiated (adaptation phase 104).

The system provides an exceptional level of flexibility beyond any hardcoded thresholds often found in monitoring tools. It fills the gap between network monitoring tools and orchestrators. Where monitoring tools usually use hard thresholds for either service latency or throughput, and performance predictions are difficult to feed into an orchestrator, the systems and methods disclosed herein use health models that may be inferred and maintained valid from telemetry data. Importantly, models are able to adapt and self-check their validity over time. This ability to generate and validate models on the fly is an important feature for the deployment of unmanned large scale solutions in data centers. Finally, upon finding performance problems, the system may either initiate a software adaptation via entry points, a dynamic frequency scaling request, or any other bespoke adaptation mechanism.

In general, the training phase 100 takes telemetry data (data collection and transformation operation 106) and uses it to generate a model (model induction operation 108). The data may be in the form of time series and be arranged as tuples of a timestamp, metadata metrics, system metrics, and performance metrics. The metadata metrics may include information, such as settings, logs, and key values. The system metrics include parameterized system observations regarding the state of the system. The performance metrics may include various metrics such as throughput, latency, power consumption, queries per hour (e.g., in a database management system), and the like.

Model induction (operation 108) may be implemented with machine learning algorithms or other suitable analytic procedures. A classification or regression model associating performance metrics to any other collected metrics (time, date, system metrics, etc.) is obtained. As an example, after cleaning the incoming data (e.g., by normalizing it, removing outliers, dealing with missing values, removing unnecessary data, etc.), the dataset is transmitted to one or more machine learning algorithms.

The execution phase 102 deploys and executes the selected model (operation 110) and continually or periodically tests for new events (decision operation 112). When a new event is detected, the flow moves to the adaptation phase 104.

In the adaptation phase 104 the application using the model is notified (operation 114) and an adaptation to the model is triggered (operation 116). The flow moves back to the instrumented entity 118 (e.g., a node in a network), which provides data to the training phase 100 and execution phase 102.

Figure 2:
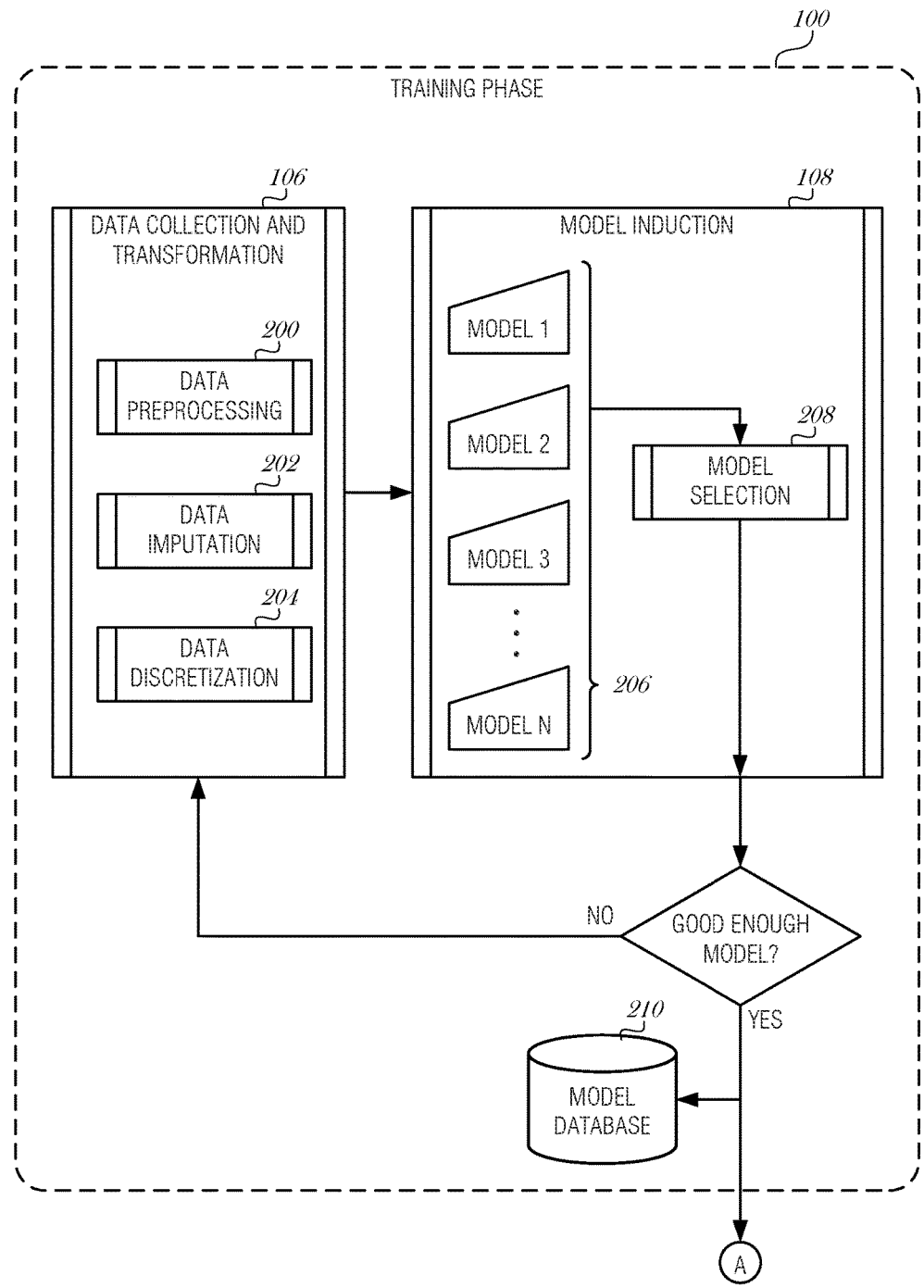
FIG. 2 is a schematic diagram illustrating the training phase, including model induction operation, according to an embodiment.

FIG. 2 is a schematic diagram illustrating the training phase 100, including model induction operation 108, according to an embodiment. The training phase 100 includes the data collection and transformation operation 106, which may include operations such as data preprocessing 200, data imputation 202, and discretization 204. Data preprocessing 200 may include operations such as data normalization, data cleaning, verification, and the like. The data imputation operation 202 replaces missing data with substituted values. Using substitute values avoids problems with analysis at later operations. Data imputation operation 202 may also be used to fill gaps, for example, when samples are collected at different sampling rates. After the data is processed, it is discretized (operation 204). Performance metric data may be discretized into various labels, or buckets, such as "low" and "high," or "low," "medium" and "high." When the data is discretized, the resulting learning strategy is said to be classification rather than regression. It is understood that although this example discretization operation is provided here, any type of data discretization may be used.

Once the data is transformed, it is used to train a plurality of models 206. In general terms, it is unlikely that a predefined algorithm will consistently learn accurate models. As such, a number of classification algorithms may be used, such as a naïve Bayes, deep learning, decision trees, rules and ensemble methods (e.g., stochastic gradient boosting), linear regression, and the like. These classification algorithms produce a number of models 206. Each model takes time series data and predicts the performance of the system. The best model is selected at operation 208. In an embodiment, the simplest model with the highest accuracy is the model that is selected. Model selection may be performed using various methods, such as Akaike information criterion (AIC), Bayesian information criterion (BIC), or minimum description length (MDL). If the "best model" available is not good enough, then the flow iterates back to the beginning of the data collection and transformation phase 106, where additional telemetry data may be obtained and analyzed to determine alternative models and select from the alternative models. Once a model is selected, the model, metrics involved, and parameters are stored in a model database 210.

If the training accuracy, measured in percentage, is over a certain predefined threshold, for example, 90% of accuracy, then the model may be declared one that is "good enough" for further evaluation. Another method to determine quality of models is by analyzing the area under the receiver operating characteristic (ROC) curve or the precision-recall curve area (PRC Area) to report model accuracy.

Figure 3:
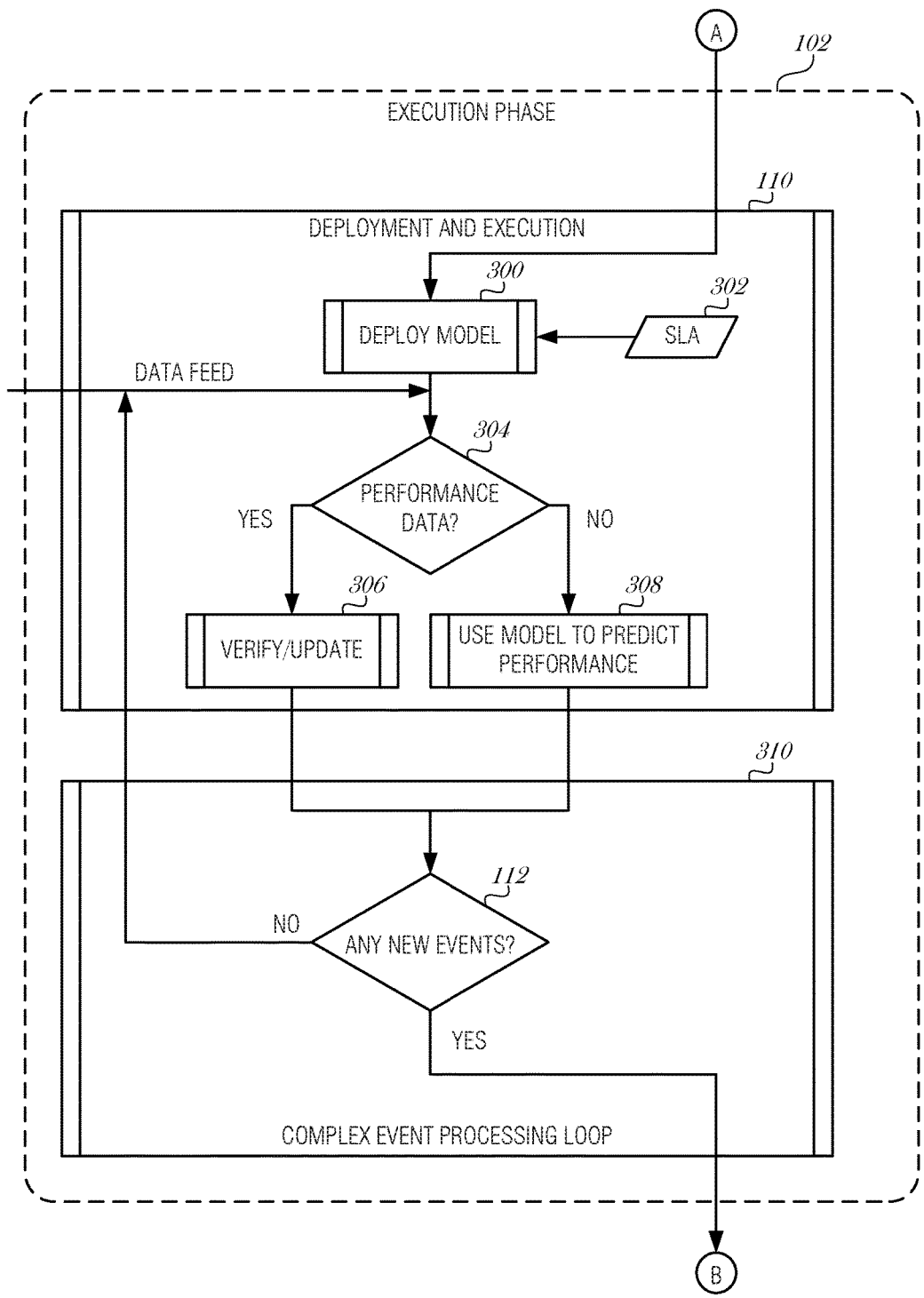
FIG. 3 is a schematic diagram illustrating the execution phase, according to an embodiment.

FIG. 3 is a schematic diagram illustrating the execution phase 102, according to an embodiment. The execution phase 102 includes generally deployment of the model, execution of the model, and then ongoing event processing. In the deployment and execution operation 110, the model is deployed (operation 300) with optional service level agreements (SLAs) 302, which may be used by business logic. Models may be deployed at an application level or at a server (e.g., platform) level. The developer may install a monitoring entry point in which actions may be injected into the application. Using the entry point, the model may be introduced and executed. Otherwise, for applications without entry points, models may be deployed in the monitoring platform or on an orchestrator platform.

The models may be seasonal or time-oriented. This seasonal or time-oriented effects will trigger a model retraining operation. Data should contain references to seasons or time-oriented information to model this effect (e.g., "holidays=true/false" or "day=weekday/weekend"). This tagging, for instance, will help the model induction when finding associations of different key performance indicators (KPIs) to holidays or weekends. Seasonal patterns or other time-oriented patterns (e.g., hourly, daily, weekly, weekday versus weekend, etc.) may be used to form fit models to certain operational timeframes. Model selection algorithms may be used for model induction and evaluation.

After deployment, the model is evaluated against new data and recalibrated when needed. In particular, a data feed is used to obtain new data. When performance data is available, then the model is verified and updated (operation 306). The difference between the observed value from the data feed (e.g., ground truth or labeled data) and the prediction is computed and used to validate the model's performance A model may be determined as being invalid using a similar or same threshold as used to determine whether a model is "good enough" (e.g., 90% accuracy threshold). Models may deteriorate over time and the model may be recalibrated or replaced. For example, when a period ends (e.g., the end of a month) and new period begins (e.g., the beginning of a new month), the time-based model for the new month may be obtained from the model database 210 and used instead of the existing model. Alternatively, the existing model may be retrained on actual performance data. Concept drifting, a technique found in predictive analytics and machine learning, may be used to this self-validation operation. When actual performance data is not available, then the model is used to predict performance (operation 308).

The complex event processing (CEP) loop 310 is used to control the application using the model. The CEP loop 310 monitors for new events (decision operation 112). The new events may be exception events—those that indicate that the application is likely to perform poorly, that response time is below an acceptable threshold, or the like. In these cases, a responsive, possibly remedial action, is used to ensure a certain quality of service of the application. For example, if the model predicts that the application performance will suffer due to a high number of incoming database queries, the application may be temporarily disabled to not accept further database queries so that the existing queued queries have a chance to execute and the queues may flush, thereby reducing the wait time for further queries.

When there are no new events, the process flow continues to obtain new data from the data feed and use it when it is available (operation 306) or predict performance from the model (operation 308). When a new event is detected at decision operation 112, the process flow continues to the adaptation phase 104.

Figure 4:
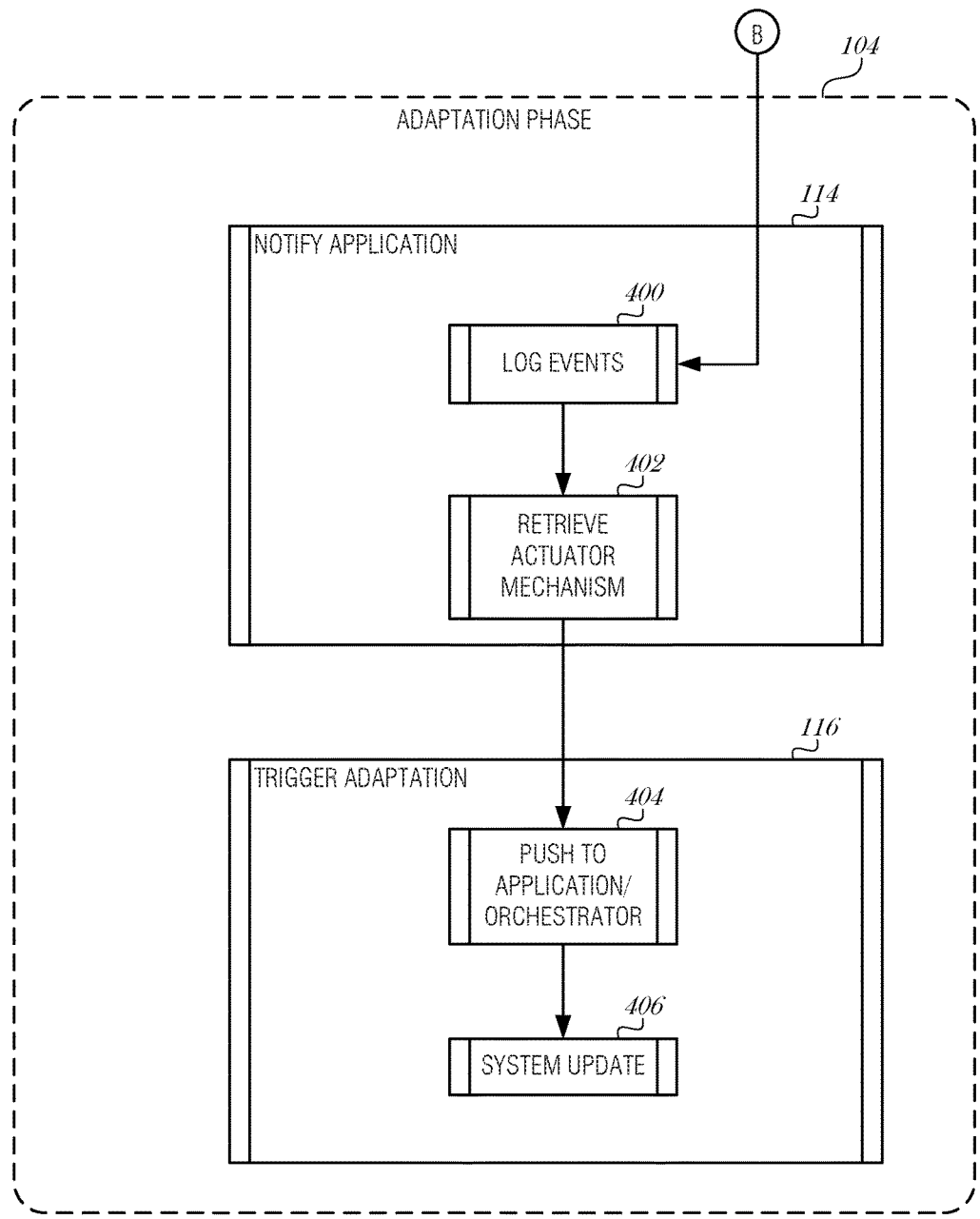
FIG. 4 is a schematic diagram illustrating the adaptation phase, according to an embodiment.

FIG. 4 is a schematic diagram illustrating the adaptation phase 104, according to an embodiment. In the notify application operation 114, the events are logged (operation 400). An actuator mechanism is retrieved (operation 402). Various mechanisms may be available based on the type of event, the type of platform, how the application is coded, and the like. For example, entry points in the source code of an application may be provided to receive an adaptation signal. A number of possible adaptation actions may be injected into the code or operating systems. As an example, an adaptation mechanism may be to throttle the central processing unit (CPU) by modifying the operational frequency (referred to as dynamic frequency scaling). Alternatively, the application may have an entry point to regulate its workload by reducing the CPU usage (e.g., executing a sleep or NOOP operations) or by modifying the process priority (e.g., the UNIX "nice" command).

Once the actuator mechanism is selected, the command control mechanism is pushed to the application or orchestrator (operation 404) and the system is updated (operation 406). The adaptation phase 104 may take place in-band (e.g., injected into the application) or out-of-band (e.g., via a node manager or orchestrator).

As such, the framework that includes the training phase 100, the execution phase 102, and the adaptation phase 104, enables automatic generation of health check models, their self-validation, and their use for performance prediction. When performance issues arise, predefined response mechanism are dispatched to the platform orchestrator or application to mitigate the problem.

As a non-limiting illustrative example, in a database management system context, performance metrics of power consumption and queries per hour may be tracked. Performance metrics may be quantified as "queries per watt" and may be discretized into "low" and "high" ranges. Multiple machine learning algorithms may be used to determine a "best" model, which is selected and injected into the database application. A model may be reduced to an if-then-else code block, which may be injected into application code. An example if-then-else may control the application such that when the performance is predicted as being "low," the application may be issued a "sleep" command. The rationale being that when the application is saturated with queries, resulting in perceived degradation in the queries per hour and corresponding higher power consumption, the application is issued a sleep command that allows the system to reduce the CPU load and power utilization. The performance prediction and self-validation takes place when actual performance data is available. As described elsewhere in this document, the application may be modified to reduce power consumption or a node manager may be used to alter the behavior of the node directly. When the model is no longer viable (e.g., determined through self-validation), the model is replaced or recalibrated.

Figure 5:
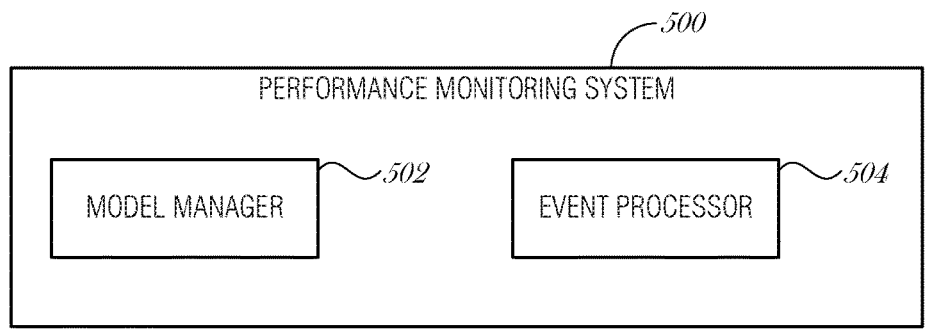
FIG. 5 is a block diagram illustrating a performance monitoring system, according to an embodiment.

FIG. 5 is a block diagram illustrating a performance monitoring system 500, according to an embodiment. The system 500 may include a model manager 502 and an event processor 504. The model manager 502 may be configured to identify a performance model that predicts performance of an operational node, the performance model based on telemetry data from the operational node. The model manager 502 may be further configured to implement an automatic verification operation to analyze the performance model and revise the performance model when the performance model is no longer valid.

The event processor 504 may be configured to initiate a remedial action at the operational node when the performance model indicates an alert state.

In an embodiment, the operational node comprises a database server. In an embodiment, the telemetry data comprises processor power consumption, database queries over time, network latency, or network throughput. It is understood that any telemetry data may be used by the system 500 to build a model or test its validity.

In an embodiment, to identify the performance model, the model manager 502 is to access the telemetry data from the operational node and select the performance model from a plurality of performance models generated from a corresponding plurality of classification algorithms. In a further embodiment, the plurality of classification algorithms comprises a naïve Bayes classifier, a deep learning technique, a decision tree learning technique, a stochastic gradient boosting technique, or a regression analysis.

In an embodiment, to implement the automatic verification operation, the model manager 502 is to compare an observed value from the telemetry data to a predicted value from the performance model and declare the performance model invalid when the observed value deviates from the predicted value by more than a threshold amount.

In an embodiment, to initiate the remedial action, the event processor is to monitor for the alert state, retrieve an actuator mechanism when the alert state occurs, and trigger an adaptation at the operational node using the actuator mechanism. In a further embodiment, the actuator mechanism is a code injection and the adaptation includes injecting executable instructions into an application executing on the operational node. In a related embodiment, the actuator mechanism is a command to a node manager, the command initiating the node manager to conduct the remedial action on the operational node.

Figure 6:
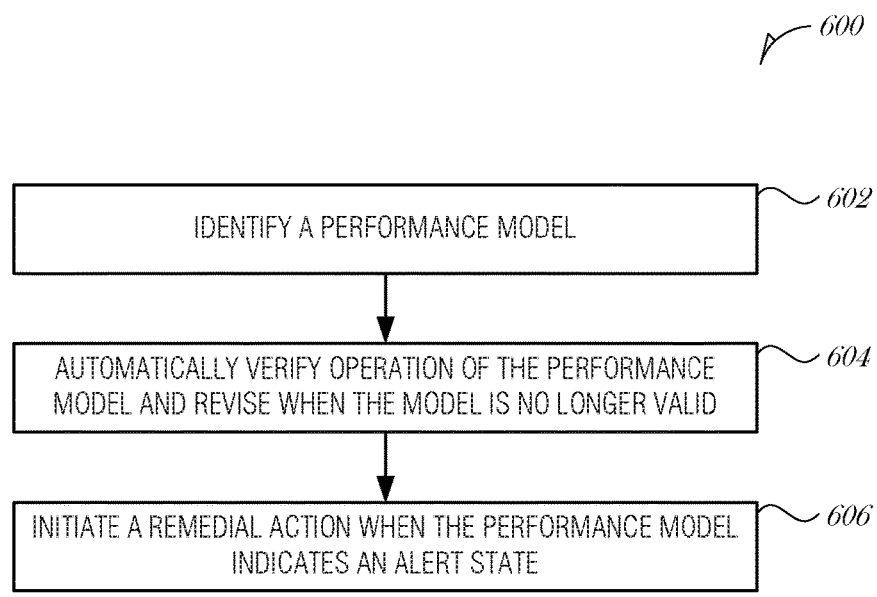
FIG. 6 is a flowchart illustrating a method of monitoring performance of an operational node, according to an embodiment.

FIG. 6 is a flowchart illustrating a method 600 of monitoring performance of an operational node, according to an embodiment. At block 602, a performance model that predicts performance of the operational node is identified, where the performance model based on telemetry data from the operational node.

At block 604, an automatic verification operation to analyze the performance model and revise the performance model when the performance model is no longer valid is implemented.

At block 606, a remedial action is initiated at the operational node when the performance model indicates an alert state.

In an embodiment, the operational node comprises a database server.

In an embodiment, the telemetry data comprises processor power consumption, database queries over time, network latency, or network throughput.

In an embodiment, identifying the performance model includes accessing the telemetry data from the operational node and selecting the performance model from a plurality of performance models generated from a corresponding plurality of classification algorithms. In a further embodiment, the plurality of classification algorithms comprises a naïve Bayes classifier, a deep learning technique, a decision tree learning technique, a stochastic gradient boosting technique, or a regression analysis.

In an embodiment, implementing the automatic verification operation includes comparing an observed value from the telemetry data to a predicted value from the performance model and declaring the performance model invalid when the observed value deviates from the predicted value by more than a threshold amount.

In an embodiment, initiating the remedial action includes monitoring for the alert state, retrieving an actuator mechanism when the alert state occurs, and triggering an adaptation at the operational node using the actuator mechanism. In a further embodiment, the actuator mechanism is a code injection and the adaptation includes injecting executable instructions into an application executing on the operational node. In a related embodiment, the actuator mechanism is a command to a node manager, the command initiating the node manager to conduct the remedial action on the operational node.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 7:
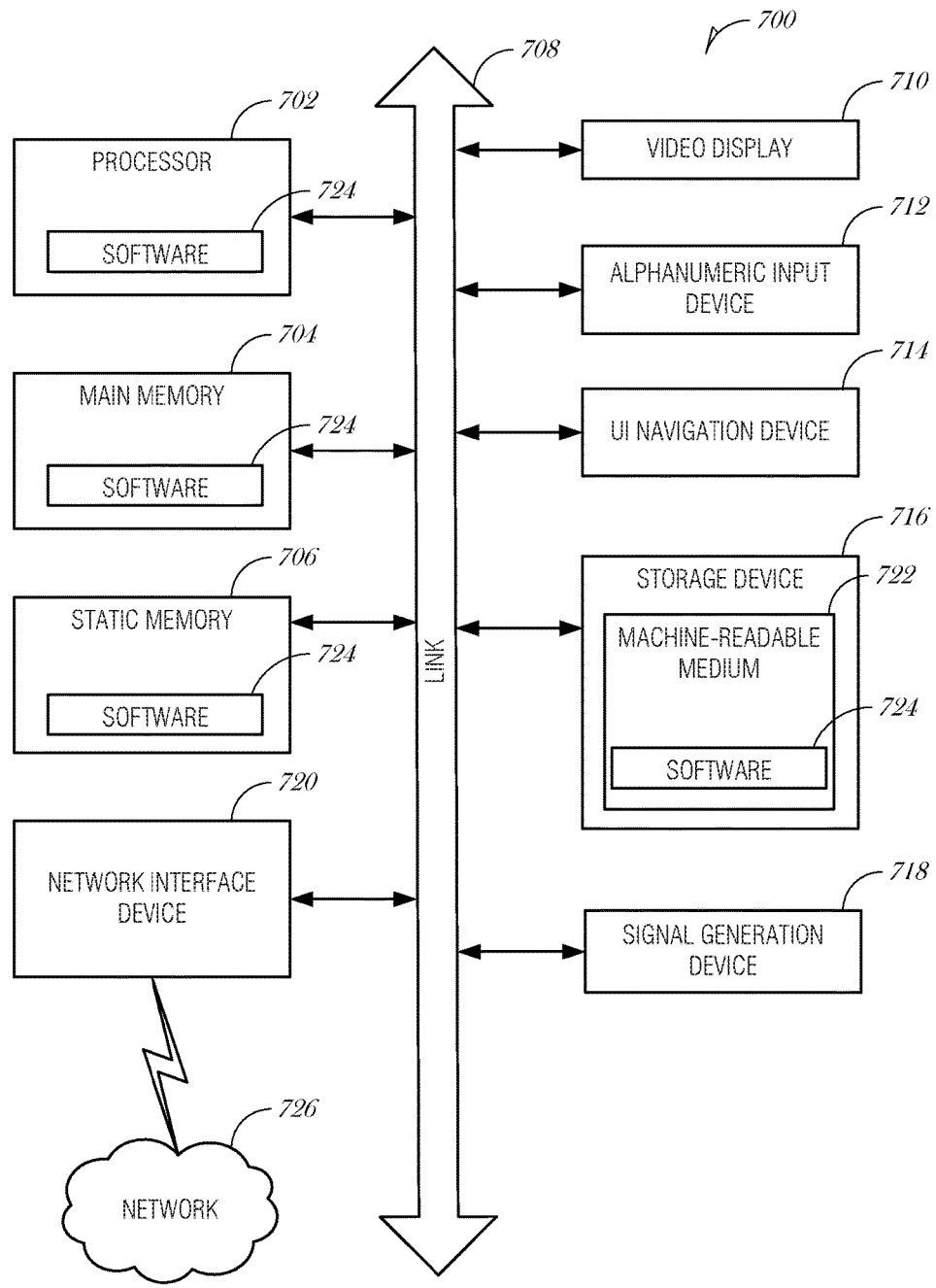
FIG. 7 is a block diagram illustrating an example machine upon which any one or more of the techniques (e.g., methodologies) discussed herein may perform, according to an example embodiment.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, gyrometer, magnetometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 includes subject matter (such as a device, apparatus, or machine) for performance monitoring comprising: a model manager to: identify a performance model that predicts performance of an operational node, the performance model based on telemetry data from the operational node; and implement an automatic verification operation to analyze the performance model and revise the performance model when the performance model is no longer valid; and an event processor to: initiate a remedial action at the operational node when the performance model indicates an alert state.

In Example 2, the subject matter of Example 1 may include, wherein the operational node comprises a database server.

In Example 3, the subject matter of any one of Examples 1 to 2 may include, wherein the telemetry data comprises processor power consumption, database queries over time, network latency, or network throughput.

In Example 4, the subject matter of any one of Examples 1 to 3 may include, wherein to identify the performance model, the model manager is to: access the telemetry data from the operational node; and select the performance model from a plurality of performance models generated from a corresponding plurality of classification algorithms.

In Example 5, the subject matter of any one of Examples 1 to 4 may include, wherein the plurality of classification algorithms comprises a naïve Bayes classifier, a deep learning technique, a decision tree learning technique, a stochastic gradient boosting technique, or a regression analysis.

In Example 6, the subject matter of any one of Examples 1 to 5 may include, wherein to implement the automatic verification operation, the model manager is to: compare an observed value from the telemetry data to a predicted value from the performance model; and declare the performance model invalid when the observed value deviates from the predicted value by more than a threshold amount.

In Example 7, the subject matter of any one of Examples 1 to 6 may include, wherein to initiate the remedial action, the event processor is to: monitor for the alert state; retrieve an actuator mechanism when the alert state occurs; and trigger an adaptation at the operational node using the actuator mechanism.

In Example 8, the subject matter of any one of Examples 1 to 7 may include, wherein the actuator mechanism is a code injection and wherein the adaptation comprises injecting executable instructions into an application executing on the operational node.

In Example 9, the subject matter of any one of Examples 1 to 8 may include, wherein the actuator mechanism is a command to a node manager, the command initiating the node manager to conduct the remedial action on the operational node.

Example 10 includes subject matter (such as a method, means for performing acts, machine readable medium including instructions that when performed by a machine cause the machine to performs acts, or an apparatus to perform) for monitoring performance of an operational node comprising: identifying a performance model that predicts performance of the operational node, the performance model based on telemetry data from the operational node; implementing an automatic verification operation to analyze the performance model and revise the performance model when the performance model is no longer valid; and initiating a remedial action at the operational node when the performance model indicates an alert state.

In Example 11, the subject matter of Example 10 may include, wherein the operational node comprises a database server.

In Example 12, the subject matter of any one of Examples 10 to 11 may include, wherein the telemetry data comprises processor power consumption, database queries over time, network latency, or network throughput.

In Example 13, the subject matter of any one of Examples 10 to 12 may include, wherein identifying the performance model comprises: accessing the telemetry data from the operational node; and selecting the performance model from a plurality of performance models generated from a corresponding plurality of classification algorithms.

In Example 14, the subject matter of any one of Examples 10 to 13 may include, wherein the plurality of classification algorithms comprises a naïve Bayes classifier, a deep learning technique, a decision tree learning technique, a stochastic gradient boosting technique, or a regression analysis.

In Example 15, the subject matter of any one of Examples 10 to 14 may include, wherein implementing the automatic verification operation comprises: comparing an observed value from the telemetry data to a predicted value from the performance model; and declaring the performance model invalid when the observed value deviates from the predicted value by more than a threshold amount.

In Example 16, the subject matter of any one of Examples 10 to 15 may include, wherein initiating the remedial action comprises: monitoring for the alert state; retrieving an actuator mechanism when the alert state occurs; and triggering an adaptation at the operational node using the actuator mechanism.

In Example 17, the subject matter of any one of Examples 10 to 16 may include, wherein the actuator mechanism is a code injection and wherein the adaptation comprises injecting executable instructions into an application executing on the operational node.

In Example 18, the subject matter of any one of Examples 10 to 17 may include, wherein the actuator mechanism is a command to a node manager, the command initiating the node manager to conduct the remedial action on the operational node.

Example 19 includes at least one machine-readable medium including instructions, which when executed by a machine, cause the machine to perform operations of any of the Examples 10-18.

Example 20 includes an apparatus comprising means for performing any of the Examples 10-18.

Example 21 includes subject matter (such as a device, apparatus, or machine) for monitoring performance of an operational node comprising: means for identifying a performance model that predicts performance of the operational node, the performance model based on telemetry data from the operational node; means for implementing an automatic verification operation to analyze the performance model and revise the performance model when the performance model is no longer valid; and means for initiating a remedial action at the operational node when the performance model indicates an alert state.

In Example 22, the subject matter of Example 21 may include, wherein the operational node comprises a database server.

In Example 23, the subject matter of any one of Examples 21 to 22 may include, wherein the telemetry data comprises processor power consumption, database queries over time, network latency, or network throughput.

In Example 24, the subject matter of any one of Examples 21 to 23 may include, wherein the means for identifying the performance model comprise: means for accessing the telemetry data from the operational node; and means for selecting the performance model from a plurality of performance models generated from a corresponding plurality of classification algorithms.

In Example 25, the subject matter of any one of Examples 21 to 24 may include, wherein the plurality of classification algorithms comprises a naïve Bayes classifier, a deep learning technique, a decision tree learning technique, a stochastic gradient boosting technique, or a regression analysis.

In Example 26, the subject matter of any one of Examples 21 to 25 may include, wherein the means for implementing the automatic verification operation comprise: means for comparing an observed value from the telemetry data to a predicted value from the performance model; and means for declaring the performance model invalid when the observed value deviates from the predicted value by more than a threshold amount.

In Example 27, the subject matter of any one of Examples 21 to 26 may include, wherein the means for initiating the remedial action comprise: means for monitoring for the alert state; means for retrieving an actuator mechanism when the alert state occurs; and means for triggering an adaptation at the operational node using the actuator mechanism.

In Example 28, the subject matter of any one of Examples 21 to 27 may include, wherein the actuator mechanism is a code injection and wherein the adaptation comprises injecting executable instructions into an application executing on the operational node.

In Example 29, the subject matter of any one of Examples 21 to 28 may include, wherein the actuator mechanism is a command to a node manager, the command initiating the node manager to conduct the remedial action on the operational node.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A performance monitoring system, the system comprising:
   at least one processor; and
   memory including instructions that, when executed by the at least one processor, cause the at least one processor to perform operations to:
      identify a performance model that predicts performance of an operational node, the performance model based on telemetry data from the operational node
      reduce the performance model to an application code block;
      inject the application code block into an application via a monitoring entry point of an application executing on the operational node, wherein the injection of the application code block modifies the source code of the application executing on the operational node;
      initiate a remedial action at the operational node when the performance model indicates an alert state, wherein the remedial action includes issuing a command to the application code block to alter the performance of the operational node; and
      invoke an automatic verification operation to analyze the performance model and revise the performance model and the application code block when the performance model is no longer valid.

2. The system of claim 1, wherein the operational node comprises a database server.

3. The system of claim 1, wherein the telemetry data comprises processor power consumption, database queries over time, network latency, or network throughput.

4. The system of claim 1, wherein the instructions to identify the performance model comprise instructions to:
   access the telemetry data from the operational node; and
   select the performance model from a plurality of performance models generated from a corresponding plurality of classification algorithms.

5. The system of claim 4, wherein the plurality of classification algorithms comprises a naïve Bayes classifier, a deep learning technique, a decision tree learning technique, a stochastic gradient boosting technique, or a regression analysis.

6. The system of claim 1, wherein the instructions to implement the automatic verification operation comprise instructions to:
   compare an observed value from the telemetry data to a predicted value from the performance model; and
   declare the performance model invalid when the observed value deviates from the predicted value by more than a threshold amount.

7. The system of claim 1, wherein the instructions to initiate the remedial action comprise instructions to:
   monitor for the alert state;
   retrieve an actuator mechanism when the alert state occurs; and
   trigger an adaptation at the operational node using the actuator mechanism.

8. The system of claim 7, wherein the actuator mechanism is a second code injection and wherein the adaptation comprises injecting executable instructions into an application executing on the operational node, wherein the executable instructions are injected into source code of the application.

9. The system of claim 7, wherein the actuator mechanism is a command to a node manager, the command initiating the node manager to conduct the remedial action on the operational node.

10. A method of monitoring performance of an operational node, the method comprising:
    identifying a performance model that predicts performance of the operational node, the performance model based on telemetry data from the operational node;
    reducing the performance model to an application code block;
    injecting the application code block into an application via a monitoring entry point of an application executing on the operational node, wherein the injection of the application code block modifies the source code of the application executing on the operational node;
    initiating a remedial action at the operational node when the performance model indicates an alert state, wherein the remedial action includes issuing a command to the application code block to alter the performance of the operational node; and
    invoking an automatic verification operation to analyze the performance model and revise the performance model and the application code block when the performance model is no longer valid.

11. The method of claim 10, wherein the operational node comprises a database server.

12. The method of claim 10, wherein the telemetry data comprises processor power consumption, database queries over time, network latency, or network throughput.

13. The method of claim 10, wherein identifying the performance model comprises:
    accessing the telemetry data from the operational node; and
    selecting the performance model from a plurality of performance models generated from a corresponding plurality of classification algorithms.

14. The method of claim 13, wherein the plurality of classification algorithms comprises a naïve Bayes classifier, a deep learning technique, a decision tree learning technique, a stochastic gradient boosting technique, or a regression analysis.

15. The method of claim 10, wherein implementing the automatic verification operation comprises:
    comparing an observed value from the telemetry data to a predicted value from the performance model; and
    declaring the performance model invalid when the observed value deviates from the predicted value by more than a threshold amount.

16. The method of claim 10, wherein initiating the remedial action comprises:
    monitoring for the alert state;
    retrieving an actuator mechanism when the alert state occurs; and
    triggering an adaptation at the operational node using the actuator mechanism.

17. The method of claim 16, wherein the actuator mechanism is a second code injection and wherein the adaptation comprises injecting executable instructions into an application executing on the operational node, wherein the executable instructions are injected into source code of the application.

18. The method of claim 16, wherein the actuator mechanism is a command to a node manager, the command initiating the node manager to conduct the remedial action on the operational node.

19. At least one non-transitory machine-readable medium including instructions for monitoring performance of an operational node, which when executed by a machine, cause the machine to:
  identify a performance model that predicts performance of the operational node, the performance model based on telemetry data from the operational node;
  reduce the performance model to an application code block;
  inject the application code block into an application via a monitoring entry point of an application executing on the operational node, wherein the injection of the application code block modifies the source code of the application executing on the operational node;
  initiate a remedial action at the operational node when the performance model indicates an alert state, wherein the remedial action includes issuing a command to the application code block to alter the performance of the operational node; and
  invoke an automatic verification operation to analyze the performance model and revise the performance model and the application code block when the performance model is no longer valid.

20. The at least one machine-readable medium of claim 19, wherein the operational node comprises a database server.

21. The at least one machine-readable medium of claim 19, wherein the telemetry data comprises processor power consumption, database queries over time, network latency, or network throughput.

22. The at least one machine-readable medium of claim 19, wherein the instructions to identify the performance model comprise instructions to:
  access the telemetry data from the operational node; and
  select the performance model from a plurality of performance models generated from a corresponding plurality of classification algorithms.

23. The at least one machine-readable medium of claim 22, wherein the plurality of classification algorithms comprises a naïve Bayes classifier, a deep learning technique, a decision tree learning technique, a stochastic gradient boosting technique, or a regression analysis.

24. The at least one machine-readable medium of claim 19, wherein the instructions to implement the automatic verification operation comprise instructions to:
  compare an observed value from the telemetry data to a predicted value from the performance model; and
  declare the performance model invalid when the observed value deviates from the predicted value by more than a threshold amount.

25. The at least one machine-readable medium of claim 19, wherein the instructions to initiate the remedial action comprise instructions to:
  monitor for the alert state;
  retrieve an actuator mechanism when the alert state occurs; and
  trigger an adaptation at the operational node using the actuator mechanism.

* * * * *